Oct. 21, 1969   M. L. FOUGERONT   3,474,318
DIRECT CURRENT MOTOR
Filed July 20, 1966

United States Patent Office 3,474,318
Patented Oct. 21, 1969

3,474,318
DIRECT CURRENT MOTOR
Michel Louis Fougeront, 84 Rue Jullien,
92 Vanves, France
Filed July 20, 1966, Ser. No. 566,649
Claims priority, application France, July 29, 1965,
26,429
Int. Cl. H02p 1/22, 1/40, 3/20
U.S. Cl. 318—292         7 Claims

ABSTRACT OF THE DISCLOSURE

A reversible D.C. motor of the shunt field type having an armature with a winding connected to a commutator and a magnetic field structure comprising three poles, one of which poles is selectively reversible excited by a field winding which is selectively reversibly energized. The armature is energized through three brushes arranged in contact with the commutator with one brush associated with each of the poles. The reversible field winding for the reversible pole is connected across the two brushes associated with the other two poles and these two brushes are selectively connected by a suitable switch to one side of a source of D.C., while the third brush is connected to the other side of the D.C. source. The other two poles have fixed polarities and present opposite polarities to the armature. These two poles may be permanent magnets or may be excited by field windings, each having one side connected in the circuit of its associated brush, either in series therewith or in shunt. When series connected, the other side of the field winding is connected in series between the brush and its switch terminal; and when shunt connected, the other side of each field winding is connected to the brush associated with the reversible pole.

---

The invention relates to reversible D.C. motors of the type having three terminals, i.e., the motors in which rotation in either direction is obtained by connecting the power supply between a given terminal and either of the other two.

Known motors of this type are series excited, so that their speed considerably varies with the applied load.

The object of the present invention is to provide a three-terminal reversible D.C. motor having a shunt field excitation system so as to run at a substantially constant speed.

The motor according to the invention is characterized in that it comprises a magnetic circuit with three poles, an armature, three brushes associated with these poles, means for energizing the armature between one given brush and either of the other two brushes, and a shunt coil connected across the said other two brushes so as to be energized by a reversible voltage, this coil being arranged on the pole related to said given brush so as to impart a reversible polarity to this pole in view of controlling the rotation of the motor in either direction.

Figure 1:
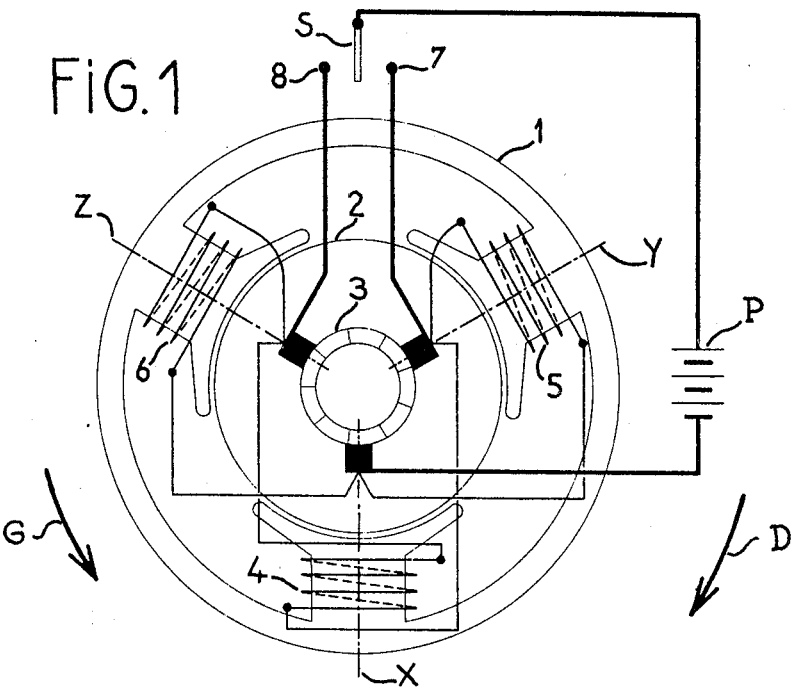

The invention is illustrated by way of example in the accompanying drawings in which:

FIG. 1 diagrammatically shows the main elements of an electric motor according to the invention and their connections.

Figure 2:
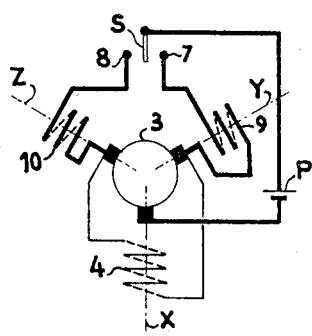
Figure 3:
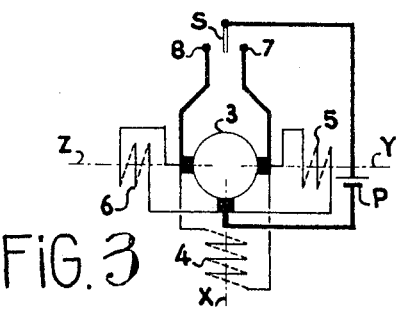

FIGS. 2 and 3 show modifications of the motor according to FIG. 1.

As represented in FIG. 1, the reversible electric D.C. motor according to the invention essentially comprises a frame 1 with three equally distributed poles respectively designated by their axes X, Y and Z, and an armature 2 having for example a lap-wound winding with a pitch of 120° and symmetrically connected to a commutator 3.

Engaged against the commutator are three brushes set on the neutral line, i.e., on the pole axes, respectively, in the embodiment contemplated. For this reason, the brushes are designated by the same reference letters X, Y and Z as those which designate the poles to which they are respectively associated.

The poles X, Y and Z are wound respectively with shunt field coils 4, 5 and 6.

The field coil 4 of the pole X is connected between the brushes Z and Y so as to produce, for instance, a north polarity under the pole X when the potential of the brush Z is lower than that of the brush Y.

The field coil 5 of the pole Y is connected between the brushes Y and X so as to produce, for instance, a south polarity under the pole Y when the potential of the brush X is lower than that of the brush Y.

Finally, the field coil 6 which is identical with the field coil 5 of the pole Y is connected between the brushes Z and X so as to produce under the pole Z a polarity reverse to that of the pole Y, that is to say a north polarity when the potential of the brush X is lower than that of the brush Z.

The brushes X, Y and Z serve as the three terminals for connecting the motor to the source. In the example shown, the brush X is connected to one of the poles, for instance the negative pole, of a source P while either of the other two brushes Y and Z may be connected to the other pole of the source through the contacts 7 and 8 respectively of a single-pole reversing switch S.

Upon closing the energizing circuit through the contact 7 of the switch S, the whole potential of the source is applied to the armature 3 through the two brushes Y and X and also to the field coil 5 of the pole Y which is thus energized so as to provide a south polarity; it should be noted that the potential of the brush Z is substantially half the potential of the brush Y relative to the potential of the brush X and that the field coil 4 of the pole X provides a north polarity.

The magnetic flux entending between the poles X and Y exert upon the armature conductors which cut said field during rotation a torque which causes the armature to rotate in the direction of the arrow D. The motor operates as a conventional two-pole shunt-wound motor under the action of both poles X and Y and the two brushes associated therewith.

It will be noted that the pole Z does not contribute to produce the torque because said pole covers a zone of the armature wherein the ampere-conductors have a resultant value which is nil. Moreover, the same pole Z is excited with a weak north polarity since its field coil 6 is energized with a voltage half that of the source.

When it is desired to reverse the motor, it is sufficient to move the switch S from the terminal 7 to the terminal 8 in order that the armature be energized between the brushes Z and X.

The potential difference across the brushes Y and Z and consequently the excitation of the field coil 4 of the pole X, thus are both reversed, so that the latter pole now has a south polarity. The north polarity of pole Z is increased whereas the south polarity of pole Y is reduced. The armature then rotates in the direction of the arrow G under the action of both poles X and Z and the two corresponding brushes.

It may be observed that, if both field coils 5 and 6 of poles Y and Z are simultaneously disconnected, the field coil 4 on pole X being then alone energized, the motor is able to run similarly in either direction, however with a reduced torque because of the reduction in the net flux.

A characteristic feature is the fact that the reversible field coil 4 on the pole X alone assigns the desired rotational direction to the armature while the field coils 5 and 6 on poles Y and Z serve only to boost the net flux of the motor in the direction selected by the reversible field coil 4 on pole X.

Since poles Y and Z each have a polarity which is unvariable and independent from the rotational direction of the armature, they may be replaced by permanent magnets of corresponding opposite polarities. This makes it possible to simplify to the utmost the structure and the inner circuits of the motor.

It will be noted that the armature develops an armature reaction directed along the axis of that of the two poles Y or Z which is inoperative, i.e., the pole Z when the armature is rotating in the direction of the arrow D or the pole Y when the armature is rotating in the direction of the arrow G. The field coil on the inoperative pole is energizing said pole in a direction opposite to said armature reaction, said pole thus having a function which is similar to that of an interpole in a conventional machine provided with commutation poles.

The motor as described above is of the shunt-wound type. In order to make it a compound-wound motor, it is sufficient, for instance as represented in FIG. 2, to replace the shunt-field coils 5 and 6 by series-field coils 9 and 10 respectively connected in the circuits of the brushes Y and Z. The arrangement is such that poles Y and Z have the same polarities as in the embodiment of FIG. 1. The operation of this modification is similar to that of the embodiment of FIG. 1. The only difference lies in the fact that when switch S is engaged on terminal 7 for instance, field coil 10 receives no current at all whereby no field is produced in pole Z. However, the result is not modified since the resultant ampere-conductors of the armature is nil in the zone of pole Z under this condition and no torque could be created in this zone, whatever the value of the field in the pole Z.

The same is true with respect to pole Y when switch S is closed on terminal 8 to energize field coil 10.

Within the scope of the present invention, a similar reversible motor could be designed using a four-pole magnetic circuit as shown in FIG. 3 wherein three poles only would be used while the fourth is removed. Then, the two diametrically opposed poles would play the part of the poles Y and Z and the third pole or central pole that of pole X. Only the three brushes associated with said three poles would be maintained and the armature, of course, would be a lap-wound one with a pitch of 90°. The structure of this motor is similar to that of the motor of FIG. 1 with the exception that the angle between brushes X and Y and the angle between brushes X and Z are each equal to 90° instead of 120° as in FIG. 1, and that the pitch of the armature coil is 90° instead of 120°, as shown in FIG. 3. As in any conventional lap-wound four-pole armature, with this brush energization, there is one angular peripheral active layer of armature conductors extending over 90° facing brush Y, and a second angular peripheral active layer of armature conductors as extending over 90° facing brush X, while a third inactive layer of conductors extends over 180°, for a given direction of rotation of the armature. If motor is switched to the other rotational direction, one 90° active layer of conductors will be switched from the zone of brush Y to the zone of brush Z, the inactive layer still extending over 180°, however angularly shifted by 90° symmetrically with respect to the axis of brush X.

As many changes could be made in the above construction, and many widely different embodiments of this invention could be made without departing from the scope of the claims, it is intended that all matter contained in the above description or shown in the accompanying drawings shall be interpreted as illustrated and not in a limiting sense.

What I claim is:

1. A reversible rotation D.C. electric motor having a stationary magnetic field structure comprising three poles, an armature having a commutator and a winding connected thereto, means for energizing said armature winding comprising three brushes arranged in contact with said commutator with one of said brushes being associated with each of said poles, a field exciting winding for one of said poles connected across the two brushes associated with the other two of said poles, means for connecting the third of said brushes to one side of a source of D.C., and means for selectively connecting one of said two brushes to the other side of said source of D.C. whereby said field exciting winding for said one pole is selectively reversibly energized.

2. A motor as defined in claim 1 wherein said other two poles have fixed polarities opposite in directions and the polarity of said reversible one pole is opposite to that of the pole associated with the one of said two other brushes which is connected to the other side of the D.C. source.

3. A motor as defined in claim 1 wherein a field exciting winding is provided for each of said other two poles, and means for connecting each of said other two pole field exciting windings between the brush associated with its respective pole and said third brush and said other two pole windings being wound to provide opposite polarities to said two other poles.

4. A motor as defined in claim 1 wherein said other two poles are permanent magnets arranged in said field structure to provide opposite polarities toward said armature.

5. A motor as defined in claim 1 wherein a field exciting winding is provided for each of said other two poles, and means for connecting each of said other two pole field exciting windings in series circuit with the brush associated with its respective pole and said other two pole windings being wound to provide opposite polarities to said two poles.

6. A motor as defined in claim 1 wherein said poles are spaced substantially 120 electrical degrees apart.

7. A motor as defined in claim 1 wherein said one of said poles is spaced substantially 90 electrical degrees from each of said other two poles and said latter are spaced substantially 180 electrical degrees apart, and said armature winding is lap-wound with a 90° pitch.

References Cited

UNITED STATES PATENTS 2,388,023 10/1945 Tyrner _____ 310—149
2,838,724 6/1958 Ecary _____ 318—292

ORIS L. RADER, Primary Examiner
K. L. CROSSON, Assistant Examiner

U.S. Cl. X.R.

318—252, 297